US012529603B2

(12) United States Patent
Ting et al.

(10) Patent No.: US 12,529,603 B2
(45) Date of Patent: Jan. 20, 2026

(54) SENSING DEVICE

(71) Applicant: InnoLux Corporation, Miao-Li County (TW)

(72) Inventors: Chin-Lung Ting, Miao-Li County (TW); Te-Yu Lee, Miao-Li County (TW); Yu-Tsung Liu, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 401 days.

(21) Appl. No.: 18/110,364

(22) Filed: Feb. 15, 2023

(65) Prior Publication Data

US 2023/0314232 A1     Oct. 5, 2023

(30) Foreign Application Priority Data

Mar. 30, 2022   (CN) .......................... 202210332584.7

(51) Int. Cl.
*G01J 5/20* (2006.01)
*G01J 5/08* (2022.01)
*G01J 5/10* (2006.01)

(52) U.S. Cl.
CPC ............... *G01J 5/20* (2013.01); *G01J 5/0853* (2013.01); *G01J 2005/103* (2013.01)

(58) Field of Classification Search
CPC ...... G01J 5/20; G01J 5/0853; G01J 2005/103; G01J 5/0225; G01J 5/0245; G01J 5/34; G01J 5/48; G01J 2005/0077; G01K 7/22
See application file for complete search history.

(56) References Cited

U.S. PATENT DOCUMENTS

| | | | |
|---|---|---|---|
| 2008/0128619 A1* | 6/2008 | Yoshida ................. | H10N 19/00 257/E27.008 |
| 2013/0161515 A1* | 6/2013 | Park ....................... | G01J 5/023 250/338.1 |
| 2013/0264610 A1 | 10/2013 | Chen | |
| 2014/0166882 A1* | 6/2014 | Oulachgar ............... | G01J 5/20 250/338.4 |
| 2016/0356652 A1* | 12/2016 | Yun ....................... | G01J 5/0802 |
| 2020/0003627 A1* | 1/2020 | Fujii ........................ | G01J 5/34 |
| 2021/0061647 A1 | 3/2021 | Chen | |
| 2022/0262548 A1* | 8/2022 | Aoki ..................... | H01C 7/008 |

FOREIGN PATENT DOCUMENTS

CN          109813448 A  *  5/2019

OTHER PUBLICATIONS

Translation of CN 109813448 A (Year: 2019).*

* cited by examiner

*Primary Examiner* — David P Porta
*Assistant Examiner* — Mamadou Faye
(74) *Attorney, Agent, or Firm* — Winston Hsu

(57) ABSTRACT

The present disclosure provides a sensing device including a substrate and a sensing pixel. The sensing pixel is disposed on the substrate and includes an electrode and a thermistor. The thermistor is electrically connected to the electrode and is separated from the substrate by an air gap. When the sensing pixel is operated in a period, the electrode receives a voltage, and a part of the thermistor moves toward the substrate, such that the thermistor is in thermal conduction with the substrate.

18 Claims, 9 Drawing Sheets

SENSING DEVICE

BACKGROUND OF THE DISCLOSURE

1. Field of the Disclosure

The present disclosure relates to a sensing device and particularly to a sensing device with a thermistor.

2. Description of the Prior Art

With advanced technology, sensing devices used for detecting light of various wavelengths have been gradually applied to products in daily lives. Especially, the sensing device capable of detecting far infrared light generated from human body has been developed recently, and its sensing manner mainly is to absorb infrared light, convert the infrared light into a thermal signal, and then convert the thermal signal into electrical signal through a thermoelectric material, thereby achieving detection. Heat dissipation of conventional sensing element may be reduced by structural design, but the thermal signal in this design is not easy to reset, thereby affecting accuracy of the thermal signal detected next time, which needs to be solved in this field.

SUMMARY OF THE DISCLOSURE

According to some embodiments, the present disclosure provides a sensing device including a substrate and a sensing pixel. The sensing pixel is disposed on the substrate and includes a first electrode and a thermistor. The thermistor is electrically connected to the first electrode and is separated from the substrate by an air gap. When the sensing pixel is operated in a period, the first electrode receives a first voltage, and a part of the thermistor moves toward the substrate, such that the thermistor is in thermal conduction with the substrate.

These and other objectives of the present disclosure will no doubt become obvious to those of ordinary skill in the art after reading the following detailed description of the embodiment that is illustrated in the various figures and drawings.

DETAILED DESCRIPTION

Figure 1A:
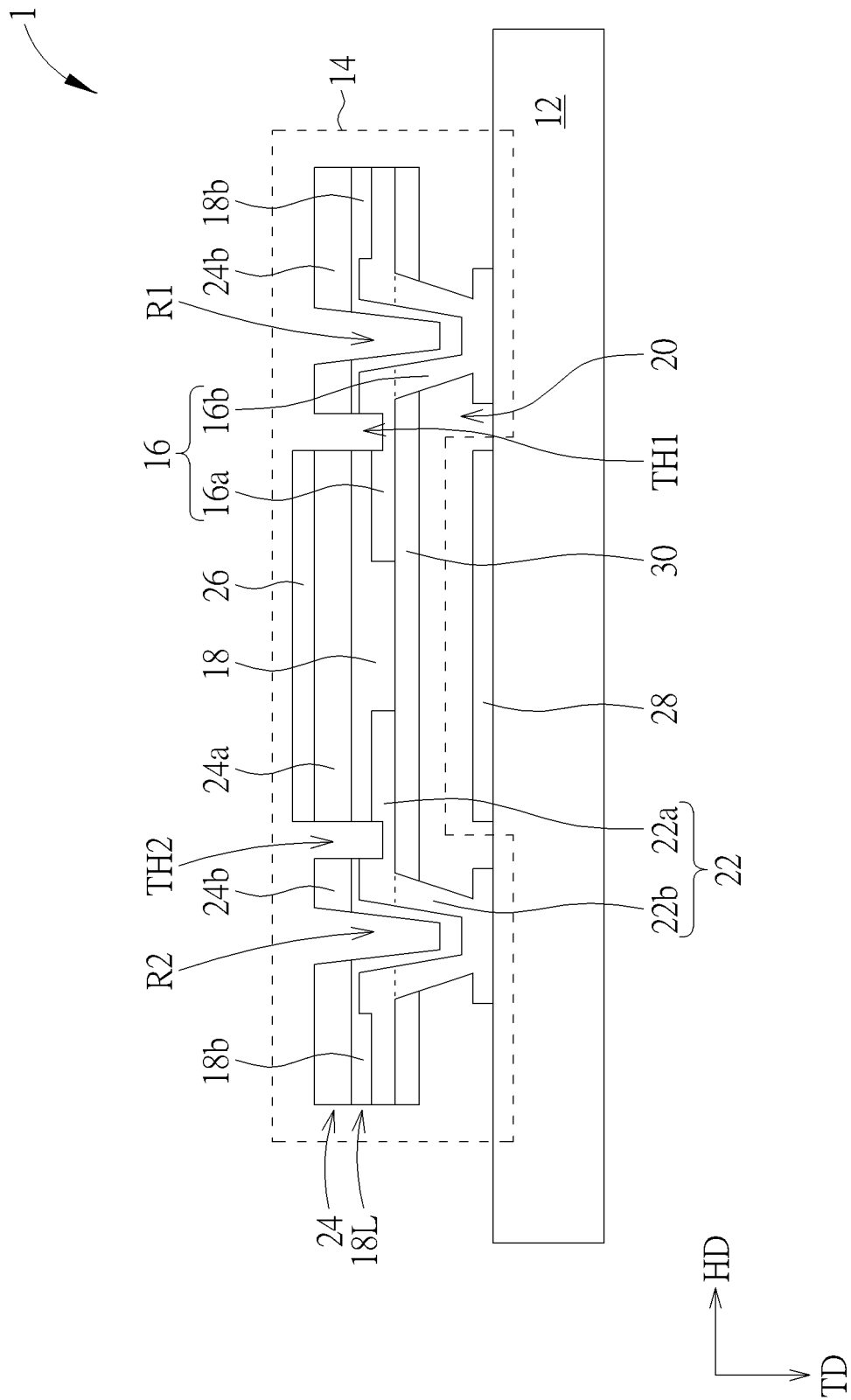
FIG. 1A schematically illustrates a cross-sectional view of a sensing device according to a first embodiment of the present disclosure.

The contents of the present disclosure will be described in detail with reference to specific embodiments and drawings. It is noted that, for purposes of illustrative clarity and being easily understood by the readers, the following drawings may be simplified schematic diagrams, and elements therein may not be drawn to scale. The numbers and sizes of the elements in the drawings are just illustrative and are not intended to limit the scope of the present disclosure.

Certain terms are used throughout the specification and the appended claims of the present disclosure to refer to specific elements. Those skilled in the art should understand that electronic equipment manufacturers may refer to an element by different names, and this document does not intend to distinguish between elements that differ in name but not function. In the following description and claims, the terms "comprise", "include" and "have" are open-ended fashion, so they should be interpreted as "including but not limited to . . . ".

The ordinal numbers used in the specification and the appended claims, such as "first", "second", etc., are used to describe the elements of the claims. It does not mean that the element has any previous ordinal numbers, nor does it represent the order of a certain element and another element, or the sequence in a manufacturing method. These ordinal numbers are just used to make a claimed element with a certain name be clearly distinguishable from another claimed element with the same name. Thus, a first element mentioned in the specification may be called a second element.

Spatially relative terms, such as "above", "on", "beneath", "below", "under", "left", "right", "before", "front", "after", "behind" and the like, used in the following embodiments just refer to the directions in the drawings and are not intended to limit the present disclosure. It may be understood that the elements in the drawings may be disposed in any kind of formation known by those skilled in the related art to describe or illustrate the elements in a certain way. Furthermore, when one element is mentioned to overlap another element, it may be understood that the element may partially or completely overlap the another element.

In addition, when one element or layer is "on" or "above" another element or layer or is "connected to" the another element or layer, it may be understood that the element or layer is directly on the another element or layer or directly connected to the another element or layer, and alternatively, another element or layer may be between the element or layer and the another element or layer (indirectly). On the contrary, when the element or layer is "directly on" the another element or layer or is "directly connected to" the another element or layer, it may be understood that there is no intervening element or layer between the element or layer and the another element or layer.

As disclosed herein, the terms "approximately", "essentially", "about", or "substantially" generally mean within 10%, 5%, 3%, 2%, 1%, or 0.5% of the reported numerical value or range. The quantity disclosed herein is an approximate quantity, that is, without a specific description of "approximately", "essentially", "about", or "substantially", the quantity may still include the meaning of "approximately", "essentially", "about", or "substantially".

It should be understood that according to the following embodiments, features of different embodiments may be replaced, recombined or mixed to constitute other embodiments without departing from the spirit of the present disclosure. The features of various embodiments may be mixed arbitrarily and used in different embodiments without departing from the spirit of the present disclosure or conflicting.

In the present disclosure, the length, thickness, width, or height may be measured by using an optical microscope (OM), a scanning electron microscope (SEM) or other approaches, but not limited thereto.

Unless otherwise defined, all terms (including technical and scientific terms) used herein have the same meaning as commonly understood by those skilled in the art. It should be understood that these terms, such as those defined in commonly used dictionaries, should be interpreted as having meaning consistent with the relevant technology and the background or context of the present disclosure, and should not be interpreted in an idealized or excessively formal way, unless there is a special definition in the embodiments of the present disclosure.

In the present disclosure, an electronic device may include a sensing device, a display device, a light emitting device, an antenna device, a curved display device or a free shape display device, but not limited thereto. Electronic elements in the electronic device may include a passive element and an active element, and for example include a capacitor, a resistor, an inductor, a diode, a transistor, etc. The diode may for example include a light emitting diode or a photodiode. The electronic device my for example be a bendable or flexible electronic device. The sensing device may be a sensing device used for detecting change in capacitances, light, heat or ultrasound, but not limited thereto. The display device may include a light emitting diode (LED), a quantum dot material, a fluorescent material, a phosphor material, other suitable materials, or any combination thereof, but not limited thereto. The LED may for example include an organic light emitting diode (OLED), a mini light emitting diode (mini-LED) or a micro light emitting diode (micro-LED), or a quantum dot light emitting diode (e.g., QLED or QDLED). In addition, the electronic device may for example include a tiled display device. The antenna device may include liquid crystal antenna, but not limited thereto. The appearance of the electronic device may be rectangular, circular, polygonal, a shape with curved edges, curved or other suitable shapes, but not limited thereto. The electronic device may have peripheral systems such as a driving system, a control system, a light source system, a shelf system, etc. It is noted that the electronic device may be any combination of the devices mentioned above, but not limited thereto. The electronic device is taken as the sensing device for an example in the following description, but the present disclosure is not limited thereto. The following sensing device may include at least one of the devices mentioned above.

Refer to FIG. 1A, which schematically illustrates a cross-sectional view of a sensing device according to a first embodiment of the present disclosure. As shown in FIG. 1A, the sensing device 1 may include a substrate 12 and a sensing pixel 14, wherein the sensing pixel 14 is disposed on the substrate 12. Although FIG. 1A shows one sensing pixel 14, the number of the sensing pixel 14 in the sensing device 1 of the present disclosure is not limited thereto. In some embodiments, the sensing device 1 may include a plurality of sensing pixels 14, for example arranged in an array, such that the sensing device 1 is able to detect images.

As shown in FIG. 1A, the sensing pixel 14 may include an electrode 16 and a thermistor 18. The thermistor 18 is electrically connected to the electrode 16, and the thermistor 18 is separated from the substrate 12 by an air gap 20. When the sensing pixel 14 is operated in a period (e.g., operated in a reset period T1 shown in FIG. 1C, FIG. 3B or FIG. 4C), the electrode 16 may receive a voltage (e.g., the voltage V3 shown in FIG. 1C or FIG. 3B or the voltage V21 shown in FIG. 4C), and a part of the thermistor 18 moves toward the substrate 12, such that the thermistor 18 is in thermal conduction with the substrate 12. In this way, a thermal signal (i.e., a sensing signal) on the thermistor 18 is able to be reset through the thermal conduction with the substrate 12, thereby improving the accuracy of the image detected by the sensing device 1.

Specifically, the electrode 16 may have a cantilever portion 16a and a pillar portion 16b, wherein a bottom of the pillar portion 16b may be disposed on the substrate 12 and fixed on the substrate 12, and the cantilever portion 16a may be connected to a top of the pillar portion 16b. The cantilever portion 16a may extend laterally, for example along a direction parallel to an upper surface of the substrate 12 (e.g., a horizontal direction HD), such that the air gap 20 may exist between the cantilever portion 16a and the substrate 12. Accordingly, the cantilever portion 16a may move toward the substrate 12, that is, the cantilever portion 16a may have a degree of freedom of movement in a direction perpendicular to the upper surface of the substrate 12 (e.g., a top view direction TD of the sensing device 1). The thermistor 18 may be disposed on a side of the cantilever portion 16a and extend to an upper surface of the cantilever portion 16a. The cantilever portion 16a may for example have an elongated top view shape, so as to reduce the thermal conduction from the thermistor 18 to the substrate 12 through the cantilever portion 16a.

In the embodiment of FIG. 1A, the sensing pixel 14 may further include an electrode 22 electrically connected to the thermistor 18. The electrode 22 and the electrode 16 are separated from each other, and the thermistor 18 may be disposed between the electrode 16 and the electrode 22. Specifically, the electrode 22 may have a cantilever portion 22a and a pillar portion 22b, wherein a bottom of the pillar portion 22b may be disposed on the substrate 12 and fixed on the substrate 12, and the cantilever portion 22a may be connected to a top of the pillar portion 22b. The cantilever portion 22a may extend laterally, for example along the direction parallel to the upper surface of the substrate 12 (e.g., the horizontal direction HD), such that the air gap 20 may exist between the cantilever portion 22a and the substrate 12. Accordingly, the cantilever portion 22a may move toward the substrate 12, that is, the cantilever portion 22a may have the degree of freedom of movement in the direction perpendicular to the upper surface of the substrate 12. The cantilever portion 22a may for example have an elongated top view shape, so as to reduce thermal conduction from the thermistor 18 to the substrate 12 through the cantilever portion 22a. For example, the structure of the electrode 22 may be similar to or the same as that of the electrode 16. The electrode 22 may for example be symmetrical to the electrode 16 with respect to the thermistor 18 located between the electrode 16 and the electrode 22. In some embodiments, when viewed along the top view direction TD, the electrode 22 and the electrode 16 may be symmetrical to each other with respect to a center point of the thermistor 18, but not limited thereto.

As shown in FIG. 1A, the sensing pixel 14 may further include an isolation layer 24 and a light absorbing layer 26. The isolation layer 24 may be disposed on the thermistor 18, and the light absorbing layer 26 may be disposed on the isolation layer 24. The light absorbing layer 26 and the thermistor 18 are separated by the isolation layer 24, so as to prevent the light absorbing layer 26 and the thermistor 18 from being short-circuited due to direct contact. The light absorbing layer 26 may for example be used to absorb infrared light, and the light absorbing layer 26 may convert the absorbed infrared light into heat, resulting in temperature change. A wavelength of the infrared light may for example range from 1 micrometer (μm) to 100 μm, 8 μm to 14 μm, or 8 μm to 12 μm, but not limited thereto. In this case, a material of the light absorbing layer 26 may for example include titanium (Ti), silicon nitride (SiNx), titanium nitride (TiN), chromium nickel (NiCr), other suitable materials or a combination of at least two of the mentioned above. The isolation layer 24 may include an electrically insulating material, such as silicon oxide (SiOx), silicon nitride (SiNx), silicon oxynitride (SiON), or other suitable materials.

It is noted that since a resistance of the thermistor 18 may change with temperature change, through the thermal conduction of the light absorbing layer 26, the isolation layer 24 and the thermistor 18, the resistance of the thermistor 18 may change with the temperature change of the light absorbing layer 26. In this way, by detecting the change of the resistance of the thermistor 18 between the electrode 22 and the electrode 16, a radiation amount of the infrared light absorbed by the light absorbing layer 26 may be obtained. When the sensing device 1 includes an array of the sensing pixels 14, a radiation image of the infrared light may be detected.

In the embodiment of FIG. 1A, the sensing pixel 14 may include a thermistor layer 18L, and the isolation layer 24 is disposed on the thermistor layer 18L. The thermistor layer 18L and the isolation layer 24 may have a through hole TH1 and a through hole TH2, so that the isolation layer 24 may be divided into an isolation portion 24a and two peripheral portions 24b by the through hole TH1 and the through hole TH2, and the thermistor layer 18L may be divided into the thermistor 18 and two peripheral portions 18b by the through hole TH1 and the through hole TH2. A material of the thermistor layer 18L or a material of the thermistor 18 may for example include amorphous silicon (a-Si) or other suitable materials.

In the embodiment of FIG. 1A, the pillar portion 16b of the electrode 16 may optionally have a groove R1, and one of the peripheral portions 18b of the thermistor layer 18L may extend into the groove R1. The pillar portion 22b of the electrode 22 may also optionally have a groove R2, and the other one of the peripheral portions 18b of the thermistor layer 18 may extend into the groove R2. In some embodiments, one of the peripheral portions 24b of the isolation layer 24 may optionally extend into the groove R1, and/or the other one of the peripheral portions 24b of the isolation layer 24 may optionally extend into the groove R2. The electrode 16 and/or the electrode 22 of the present disclosure are not limited thereto, and may not have the groove R1 and/or the groove R2.

In the present disclosure, the thermistor 18 may physically move toward the substrate 12, such that a thermal conduction path may be formed between the thermistor 18 and the substrate 12, thereby reset the thermal signal on the thermistor 18. In the embodiment of FIG. 1A, the thermistor 18 may move toward the substrate 12, for example, by an electrostatic force. Specifically, the substrate 12 may include an electrode 28, and the thermistor 18 is separated from the electrode 28 by the air gap 20. The sensing pixel 14 may further include an insulating layer 30, and the insulating layer 30 may be disposed between the thermistor 18 and the air gap 20. For example, the insulating layer 30 may be in contact with the thermistor 18, but not limited thereto. In some embodiments, the air gap 20 may exist between the electrode 28 and the electrode 16 and/or between the electrode 28 and the electrode 22. The insulating layer 30 may be disposed between the electrode 16 and the air gap 20 and/or between the electrode 22 and the air gap 20, but not limited thereto.

It should be noted that when the thermistor 18 moves toward the substrate 12, the insulating layer 30 may be in direct contact with the electrode 28 (or the substrate 12) or contact the electrode 28 (or the substrate 12) through other elements, so that the thermistor 18 and the electrode 28 (or the substrate 12) may form a thermal conduction path without being short-circuited. In the embodiment of FIG. 1A, the thermistor 18, the insulating layer 30 and the electrode 28 may form the thermal conduction path under the condition that the electrode 28 is electrically insulated from the thermistor 18, the electrode 16 and the electrode 22, and the heat on the thermistor 18 is dissipated by the substrate 12, so that the thermal signal on the thermistor 18 is able to be reset. In the embodiment of FIG. 1A, the electrode 16 and the electrode 28 may be respectively provided with voltages of different polarities to generate an electrostatic force between them, so that the insulating layer 30 is able to be in contact with the electrode 28 to achieve heat dissipation, but not limited thereto.

As shown in FIG. 1A, the electrode 28 may further have a light reflecting property, so that the electrode 28 is able to reflect light that is not absorbed and passes through the sensing pixel 14 to improve light absorption efficiency of the sensing device 1. The electrode 28 for example includes metal or other suitable materials. The element for reflecting light in the present disclosure is not limited to the electrode 28.

In some embodiments, the substrate 12 may be for example an integrated circuit chip or other types of supporting substrates for supporting the sensing pixels 14. The substrate 12 may for example include readout circuit and/or other suitable elements, but not limited thereto.

Figure 1B:
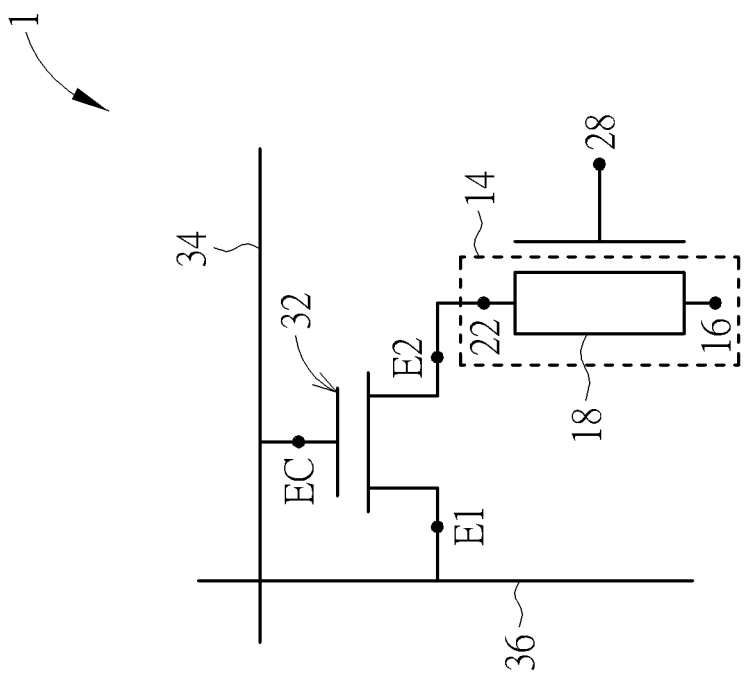
FIG. 1B schematically illustrates a circuit diagram of the sensing device according to the first embodiment of the present disclosure.

FIG. 1B schematically illustrates a circuit diagram of the sensing device according to the first embodiment of the present disclosure. As shown in FIG. 1B, the sensing device 1 may further include a switching element 32, a readout control line 34 and a readout line 36. A control terminal EC, a first terminal E1 and a second terminal E2 of the switching element 32 may be respectively electrically connected to the readout control line 34, the readout line 36 and the electrode 22, and the electrode 22 may be electrically connected to the electrode 16 through the thermistor 18. The readout control line 34 may transmit a first signal (e.g., a first signal SA shown in FIG. 1C) to the control terminal EC for controlling switching of the switching element 32. The electrode 16 may receive a second signal (e.g., a second signal SB shown in FIG. 1C), and electrode 28 may receive a third signal (e.g., a third signal SC shown in FIG. 1C), so that the movement of thermistor 18 is able to be controlled to reset the thermal signal. When the sensing device 1 is operated in a readout period (e.g., a readout period T3 shown in FIG. 1C), the switching element 32 is turned on, so that the readout line 36 may receive the thermal signal (i.e., a sensing signal) having the change information in the resistance of the thermistor 18 through the electrode 22. Although FIG. 1B illustrates one switching element 32, one readout control line 34 and one readout line 36, the number of the switching element 32, the number of the readout control line 34 and the number of the readout line 36 are not limited thereto. In some embodiments, when the sensing device 1 includes a plurality of the sensing pixels 14 arranged in an array, each switching element 32 may be electrically connected to a corresponding sensing pixel 14, and the readout control line 34 may be electrically connected to the switching elements 32 arranged in the same column (or the same row), and the readout line 36 may be electrically connected to the switching elements arranged in the same row (or the same column).

In the embodiment of FIG. 1B, the switching element 32 may be for example a transistor. In this case, the control terminal EC, the first terminal E1 and the second terminal E2 may be a gate, a source (or a drain) and a drain (or a source), respectively, but not limited thereto. The type of transistor may be adjusted according to requirements. In the embodiment of FIG. 1B, the switching element 32 is an N-type transistor as an example, but not limited thereto. In some embodiments, the switching element 32 may be a P-type transistor, but not limited thereto. The switching element 32, the readout control line 34 and the readout line 36 may be included in the substrate 12 shown in FIG. 1A, but not limited thereto.

Figure 1C:
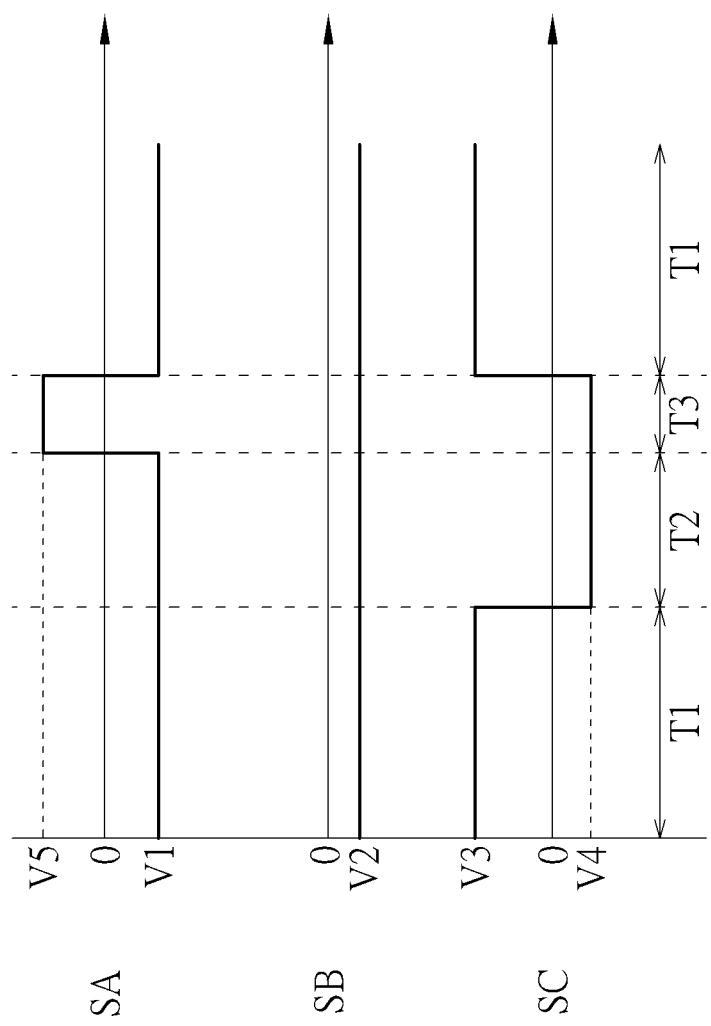
FIG. 1C schematically illustrates a timing sequences of the first signal, the second signal and the third signal according to the first embodiment of the present disclosure.

An operating method of the sensing device 1 of this embodiment is further detailed in the following description. Refer to FIG. 1C together with FIG. 1A and FIG. 1B. FIG. 1C schematically illustrates timing sequences of the first signal, the second signal and the third signal according to the first embodiment of the present disclosure. A horizontal axis shown in FIG. 1C represents time. As shown in FIG. 1C, the operation method of the sensing device may include the reset period T1, the sensing period T2 and the readout period T3 in sequence. Although FIG. 1C shows two reset periods T1, one sensing period T2 and one readout period T3, the present disclosure is not limited thereto. In some embodiments, the number of the reset period T1, the number of the sensing period T2 and the number of the readout period T3 may respectively be plural according to detecting requirements, and each reset period T1, each sensing period T2 and each readout period T3 may proceed alternately in sequence.

As shown in FIG. 1A to FIG. 1C, in the reset period T1, the first signal SA may be at a voltage V1, so that the switching element 32 may be in an off state; the second signal SB may be at a voltage V2, so that the electrode 16 may have the voltage V2; and, the third signal SC may be at a voltage V3, so that the electrode 28 may have the voltage V3. The voltage V1 may depend on the type of the transistor and mainly is a cutoff voltage of the transistor. In the embodiment of FIG. 1C, when the switching element 32 is an N-type transistor, the voltage V1 may be a negative voltage less than 0 volts (V), but not limited thereto. The voltage shown in FIG. 1C is an example, but the present disclosure is not limited thereto. In some embodiments, when the switching element 32 is a P-type transistor, the voltage V1 may be a positive voltage greater than 0 V, but not limited thereto. Since the electrode 22 is able to be electrically connected to the electrode 16 through the thermistor 18, the voltage of the electrode 22 may be the same as the voltage V2 of the electrode 16 in the reset period T1 when the switching element 32 is in the off state. It should be noted that in the reset period T1, the voltage V2 and the voltage V3 may be different from each other, so that there may be a voltage difference between the electrode 16 with the voltage V2 and the electrode 28 with the voltage V3. Accordingly, the electrostatic force may be generated between the electrode 16 and the electrode 28 to attract them to each other. When the insulating layer 30 is in contact with the electrode 28, the thermistor 18, the insulating layer 30 and the electrode 28 may form a thermal conduction path to reset the thermal signal on the thermistor 18. For example, one of the voltage V2 and the voltage V3 may be a negative voltage less than 0V, and the other one of the voltage V2 and the voltage V3 may be a positive voltage greater than 0V. One of the voltage V2 and the voltage V3 may be 0V, and the other one of the voltage V2 and the voltage V3 may be the positive voltage or the negative voltage other than 0V. Alternatively, the voltage V2 and the voltage V3 may respectively be different positive voltages or different negative voltages.

As shown in FIG. 1A to FIG. 1C, in the sensing period T2, the first signal SA may still be maintained at the voltage V1, so that the switching element 32 is still in the off state. The second signal SB may still be maintained at the voltage V2, but the voltage of the third signal SC may be changed to a voltage V4, so that the electrostatic force between the electrode 16 and the electrode 28 may disappear or be insufficient to move the thermistor 18. Accordingly, heat on the thermistor 18 may not dissipate through the substrate 12. The voltage V4 and the voltage V2 may for example be the same as each other, but not limited thereto. In the sensing period T2, the light absorbing layer 26 may absorb light to generate heat, which is conducted to the thermistor 18 through the isolation layer 24. Since in the sensing period T2, the air gap 20 begins to exist between the thermistor 18 and the electrode 28 to separate them, heat on the thermistor 18 received from the light absorbing layer 26 is not easily dissipated in the sensing period T2, thereby accurately retaining the heat received by the light absorbing layer 26.

As shown in FIG. 1A to FIG. 1C, in the readout period T3, the voltage of the first signal SA may be changed to a voltage V5 to turn on the switching element 32. In the embodiment of FIG. 1C, when the switching element 32 is the N-type transistor, the voltage V5 may be a positive voltage. In some embodiments, when the switching element 32 is the P-type transistor, the voltage V5 may be a negative voltage, but not limited thereto. Since the switching element 32 is in an on state, the readout line 36 may receive the sensing signal from the electrode 22, and the sensing signal may reflect the change in resistance of the thermistor 18 due to heat. After reading out the sensing signal, the sensing device 1 may return to the reset period T1 to reset the thermal signal on the thermistor 18, so as to improve accuracy of next detection.

The sensing device and the operating method thereof are not limited to the above-mentioned embodiment and may have different embodiments. In order to simplify the description, different embodiments hereinafter will be denoted by the same reference numerals as the same elements in the first embodiment. In order to easily compare the differences between the first embodiment and the different embodiments, the differences in the different embodiments will be described below, and same parts will not be repeated.

Figure 2:
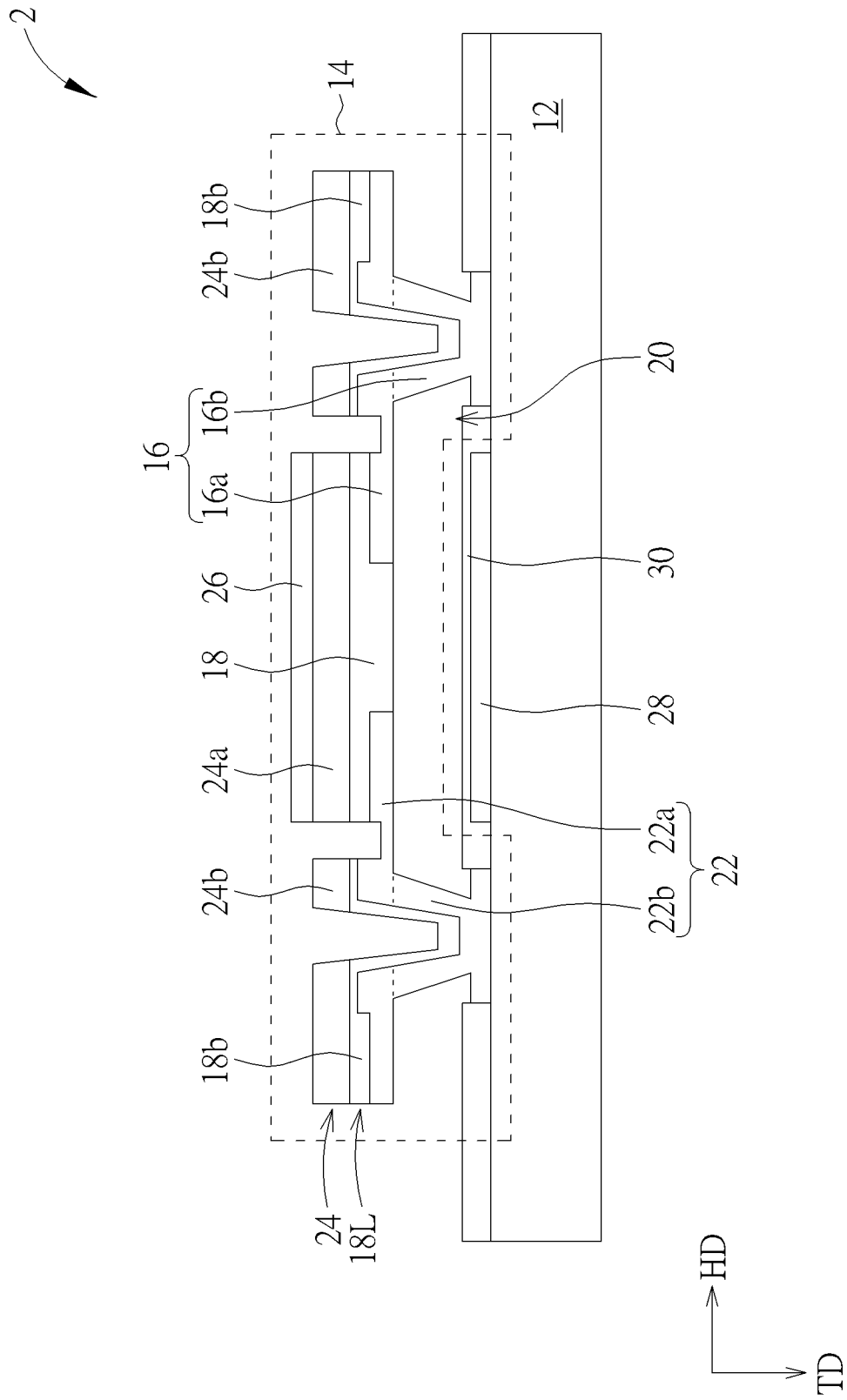
FIG. 2 schematically illustrates a cross-sectional view of a sensing device according to a second embodiment of the present disclosure.

Refer to FIG. 2, which schematically illustrates a cross-sectional view of a sensing device according to a second embodiment of the present disclosure. As shown in FIG. 2, the sensing device 2 of this embodiment differs from the sensing device 1 shown in FIG. 1A in that the insulating layer 30 may be disposed between the electrode 28 and the air gap 20. In other words, the insulating layer 30 may be disposed on a surface of the electrode 28 facing the thermistor 18 and in direct contact with the electrode 28, but the present disclosure is not limited thereto. Since other parts of the sensing device 2 shown in FIG. 2 may be the same as or similar to the sensing device 1 in FIG. 1A and FIG. 1B, they are not detailed redundantly. In the operating method of the sensing device 2, in the reset period (such as the reset period T1 of FIG. 1C), a part of the thermistor 18 may move toward the substrate 12 to be in direct contact with the insulating layer 30, such that the thermistor 18, the insulating layer 30 and the electrode 28 may form a thermal conduction path without being short-circuited, thereby resetting the thermal signal on the thermistor 18. The operating method of the sensing device 2 shown in FIG. 2 may optionally be the same as or similar to the operating method shown in FIG. 1C and will not be repeated herein.

Figure 3A:
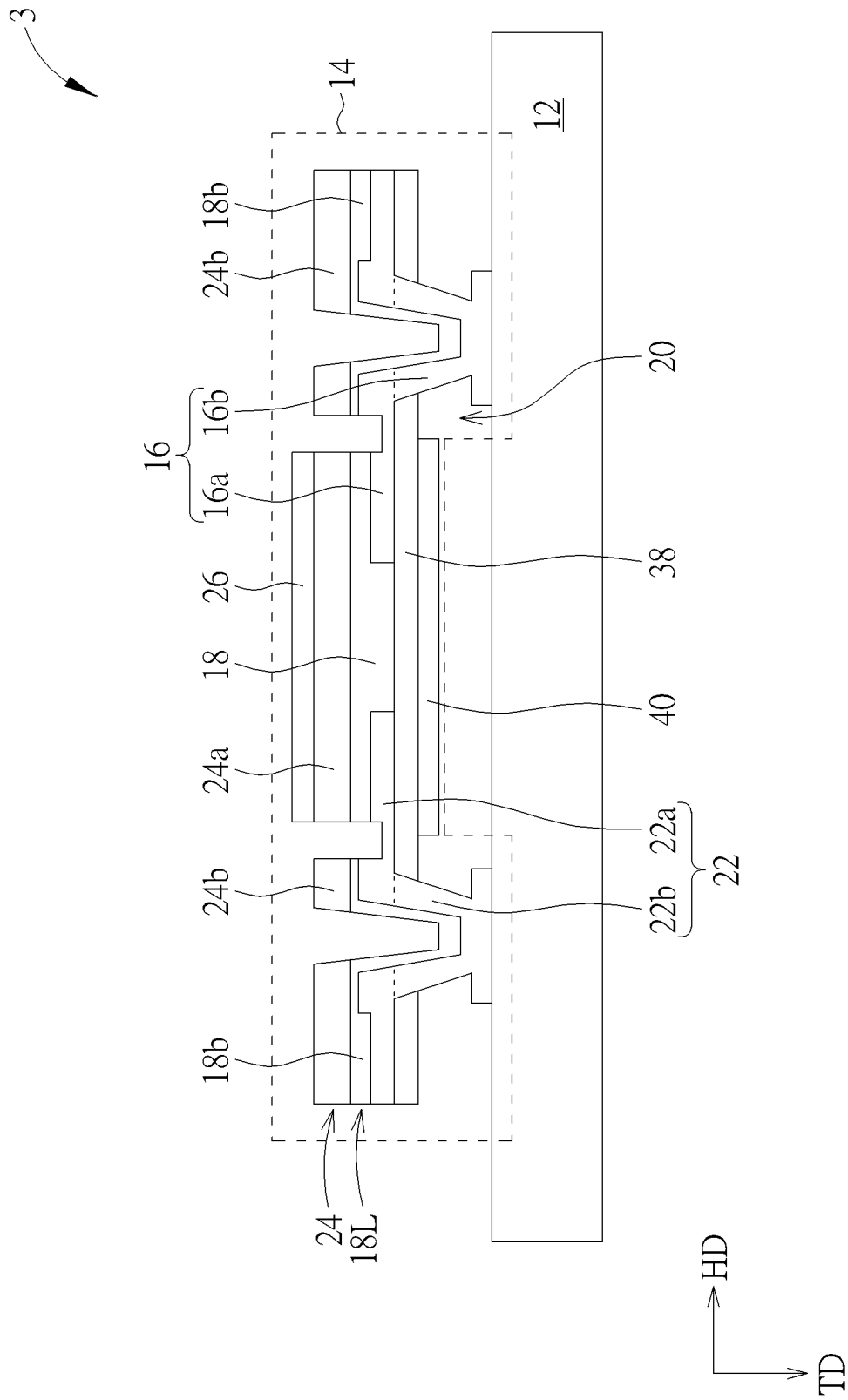
FIG. 3A schematically illustrates a cross-sectional view of a sensing device according to a third embodiment of the present disclosure.

Refer to FIG. 3A, which schematically illustrates a cross-sectional view of a sensing device according to a third embodiment of the present disclosure. As shown in FIG. 3A, the sensing device 3 of this embodiment differs from the sensing device 1 of FIG. 1A in that the thermistor 18 may move toward the substrate 12 through a piezoelectric effect. In the embodiment of FIG. 3A, the sensing pixel 14 may further include a piezoelectric layer 38 and a driving electrode 40, in which the piezoelectric layer 38 is disposed between the thermistor 18 and the air gap 20, and the driving electrode 40 is disposed on a side of the piezoelectric layer 38 facing the substrate 12. The piezoelectric layer 38 may for example be in contact with the electrode 16, the thermistor 18 and the electrode 22. Since the piezoelectric layer 38 may include a piezoelectric material, when a direction of a vertical electric field between the electrode 16 and the driving electrode 40 changes, the piezoelectric layer 38 will deform in order to resist the change of the direction of the electric field, so that the thermistor 18 connected to the piezoelectric layer 38 may move toward the substrate 12. In this way, the thermistor 18, the piezoelectric layer 38, the driving electrode 40 and the substrate 12 may form a thermal conduction path without being short-circuited to reset the thermal signal on the thermistor 18.

In the embodiment of FIG. 3A, the driving electrode 40 may have light reflecting property, so as to reflect the light that is not absorbed and passes through the sensing pixel 14, thereby improving the light absorption efficiency of the sensing device 1. The driving electrode 40 may for example include metal or other suitable materials or structures. The element for reflecting light in the present disclosure is not limited to the driving electrode 40.

In the embodiment of FIG. 3A, the sensing device 3 may not have the electrode 28 shown in FIG. 1A, but not limited thereto. In some embodiments, the substrate 12 of the sensing device 3 shown in FIG. 3A may optionally include the electrode 28, but not limited thereto. Since other parts of the sensing device 3 shown in FIG. 3A may be the same as or similar to the sensing device 1 shown in FIG. 1A or the sensing device 2 shown in FIG. 2, they are not detailed redundantly.

The sensing device 3 shown in FIG. 3A differs from the circuit shown in FIG. 1B in that the driving electrode 40 of FIG. 3A may replace the electrode 28 of FIG. 1B and receive the third signal (e.g., a third signal SC shown in FIG. 3B), but not limited thereto. Other parts of the circuit of the sensing device 3 shown in FIG. 3A may be the same as the circuit shown in FIG. 1B, and the control terminal EC and the electrode 16 may still respectively receive the first signal (e.g., the first signal SA shown in FIG. 3B) and the second signal (e.g., the second signal SB shown in FIG. 3B), so they are not detailed herein.

Figure 3B:
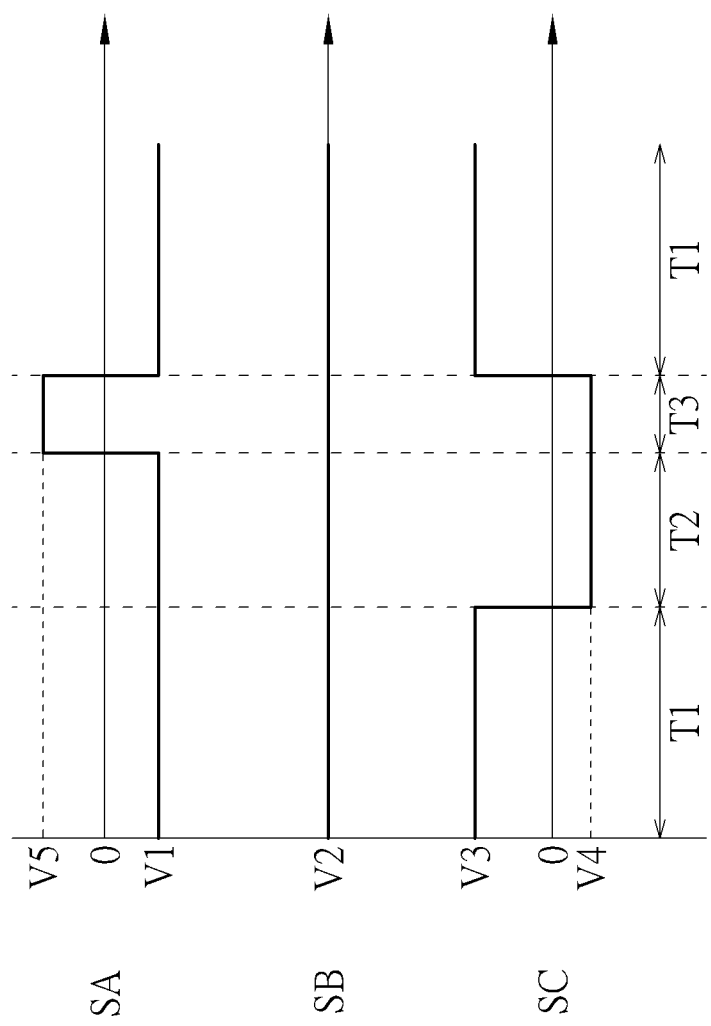
FIG. 3B schematically illustrates timing sequences of the first signal, the second signal and the third signal according to the third embodiment of the present disclosure.

The operating method of the sensing device 3 in this embodiment is further detailed in the following description. Refer to FIG. 3B together with FIG. 3A and FIG. 1B. FIG. 3B schematically illustrates timing sequences of the first signal, the second signal and the third signal according to the third embodiment of the present disclosure. The horizontal axis shown in FIG. 3B represents time. As shown in FIG. 3A and FIG. 3B, the operating method of the sensing device 3 differs from the operating method shown in FIG. 1C in that the voltage of the second signal SB and the voltage of the third signal SC may not be limited to have different polarities in the reset period T1 and may have different voltages respectively. Accordingly, the electrode 16 and the driving electrode 40 have different voltages in the reset period T1, such that the piezoelectric layer 38 is deformed. In the embodiment of FIG. 3B, in the reset period T1, the voltage V3 of the third signal SC may be greater than the voltage V2 of the second signal SB, so that an electric field with a direction opposite to the top view direction TD may be generated between the electrode 16 and the driving electrode 40. In this case, the piezoelectric layer 38 may be deformed into a shape with an upward notch, such as a bowl shape or a cup shape, so that the thermistor 18, the piezoelectric layer 38, the driving electrode 40 and the substrate 12 may form a thermal conduction path. For example, in the reset period T1, the voltage V2 of the second signal SB may be 0V, and the voltage V3 of the third signal SC may be a positive voltage, but not limited thereto. The voltages shown in FIG. 3B are an example, but the present disclosure is not limited thereto. In some embodiments, under the condition that the voltage V3 of the third signal SC is greater than the voltage V2 of the second signal SB, the voltage V2 of the second signal SB and the voltage V3 of the third signal SC may respectively be two of a positive voltage, 0V and a negative voltage, or respectively be positive voltages or negative voltages. In the embodiment of FIG. 3B, the first signal SA may be similar to or the same as the first signal SA shown in FIG. 1C and will not be repeated herein.

In the sensing period T2, the light absorbing layer 26 may absorb light to generate heat, which is conducted to the thermistor 18 through the isolation layer 24. Simultaneously, the voltage of the third signal SC may be changed to a voltage V4, which is less than the voltage of the second signal SB, so the direction of the electric field between the electrode 16 and the driving electrode 40 may be changed from the direction opposite to the top view direction TD to a direction the same as the top view direction TD. In this case, the shape of the piezoelectric layer 38 may be changed to a shape with a downward notch (e.g., dome-shaped) or a flat shape, so that the driving electrode 40 is not in contact with the substrate 12. Therefore, the heat of the thermistor 18 received from the light absorbing layer 26 is not easily dissipated, thereby accurately retaining the heat absorbed by the light absorbing layer 26. For example, in the sensing period T2, the voltage V2 of the second signal SB may be 0V, and the voltage V4 of the third signal SC may be a negative voltage, but not limited thereto. In some embodiments, under the condition that the voltage V4 of the third signal SC is less than or equal to the voltage V2 of the second signal SB, the voltage V2 of the second signal SB and the voltage V4 of the third signal SC may respectively be two of a positive voltage, 0V and a negative voltage, or respectively be positive voltages or negative voltages.

In the readout period T3, the voltage of the first signal SA may be changed to the voltage V5 to turn on the switching element (the switching element 32 shown in FIG. 1B), such that the readout line (the readout line 36 shown in FIG. 1B) may receive the thermal signal on the thermistor 18 from the electrode 22. After reading out the thermal signal, the sensing device 3 may return to the reset period T1 to reset the thermal signal on the thermistor 18, so as to facilitate improving accuracy of next detection. In the embodiment of FIG. 3B, the voltage of the second signal SB may be for example a direct current (DC) voltage, and thus, the second signal SB may have the same voltage in the reset period T1, the sensing period T2 and the readout period T3, but not limited thereto.

In some embodiments, in the reset period T1, the voltage V3 of the third signal SC may be less than the voltage V2 of the second signal SB, and in the sensing period T2 and the readout period T3, the voltage V4 of the third signal SC may be greater than or equal to the voltage V2 of the second signal SB.

Figure 4A:
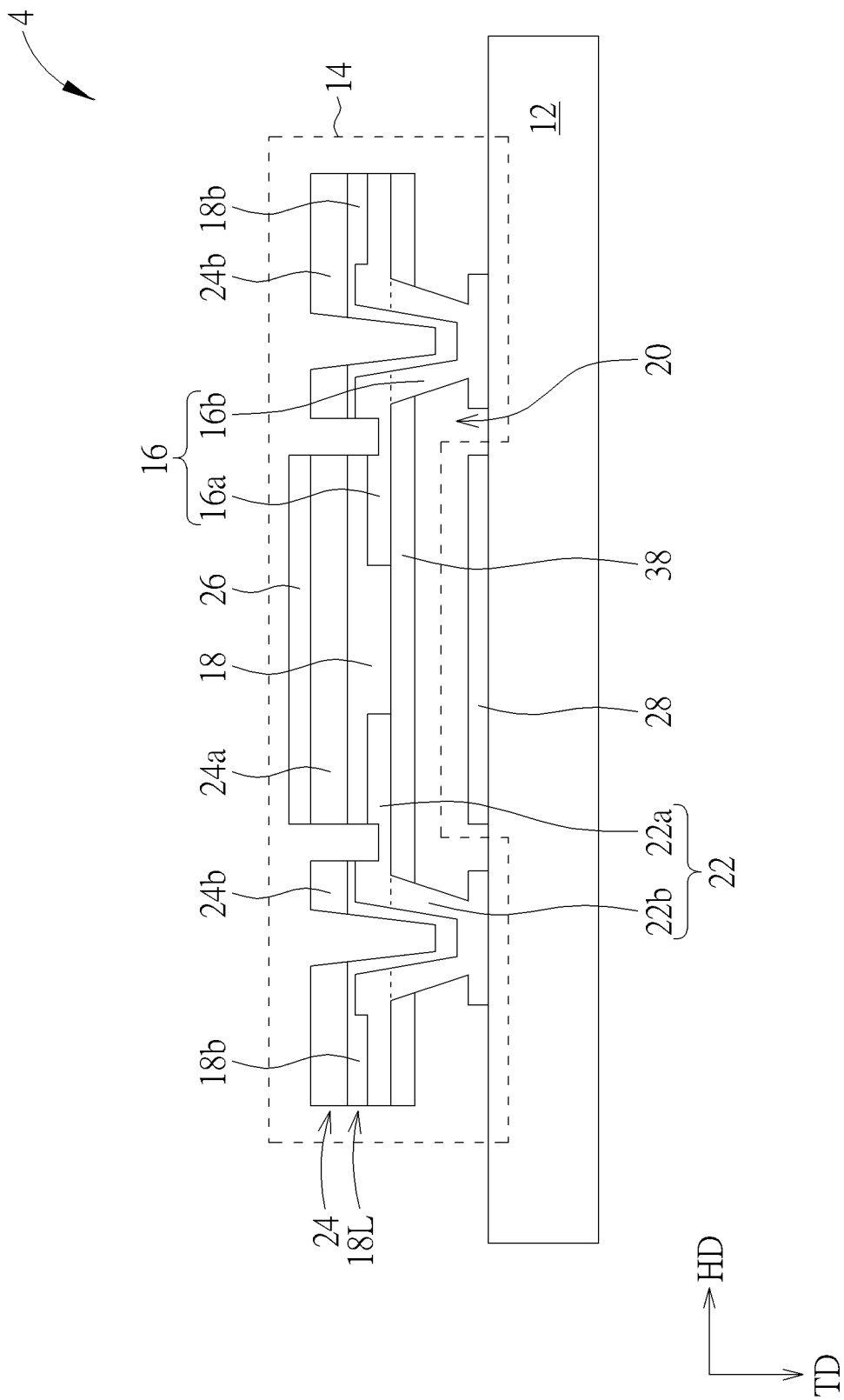
FIG. 4A schematically illustrates a cross-sectional view of a sensing device according to a fourth embodiment of the present disclosure.

Please refer to FIG. 4A, which schematically illustrates a cross-sectional view of a sensing device according to a fourth embodiment of the present disclosure. As shown in FIG. 4A, the sensing device 4 of this embodiment differs from the sensing device 3 of FIG. 3A in that the sensing device 4 may not include the driving electrode 40. In the embodiment of FIG. 4A, the deformation of the piezoelectric layer 38 may be controlled by changing a direction of a lateral electric field between the electrode 16 and the electrode 22. In the embodiment of FIG. 4A, the sensing device 4 may optionally include the electrode 28 for reflecting light that is not absorbed and passes through the sensing pixel 14, so as to improve the light absorption efficiency of the sensing device 4. The electrode 28 may for example include metal or other suitable material or structure. Since other parts of the sensing device 4 shown in FIG. 4A may be the same as or similar to the sensing device 1 of FIG. 1A, the sensing device of FIG. 2, or the sensing device 3 of FIG. 3A, they will not be detailed herein.

Figure 4B:
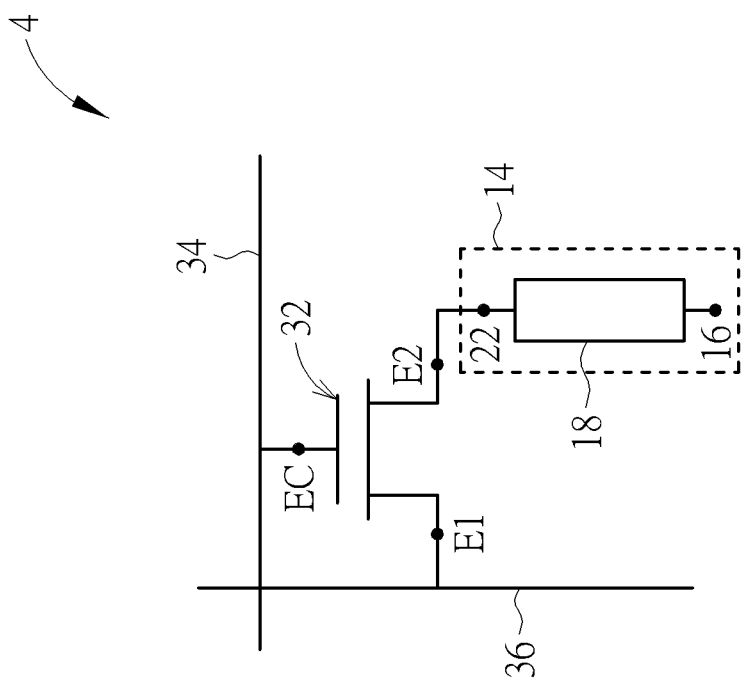
FIG. 4B schematically illustrates a circuit diagram of the sensing device according to the fourth embodiment of the present disclosure.

FIG. 4B schematically illustrates a circuit diagram of the sensing device according to the fourth embodiment of the present disclosure. As shown in FIG. 4B, the circuit of the sensing device 4 of this embodiment differs from the circuit of FIG. 1B in that the sensing device 4 does not need to provide the third signal to the electrode 28, so the signal terminal of the electrode 28 may be omitted.

Figure 4C:
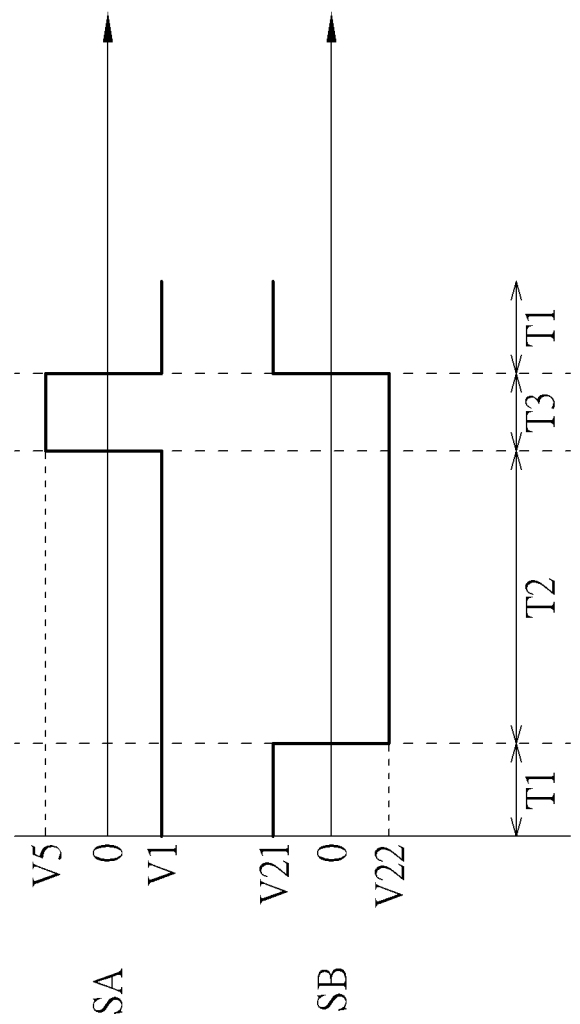
FIG. 4C schematically illustrates timing sequences of the first signal and the second signal according to the fourth embodiment of the present disclosure.

The operating method of the sensing device 4 in this embodiment is further detailed in the following description. Please refer to FIG. 4C together with FIG. 4B. FIG. 4C schematically illustrates timing sequences of the first signal and the second signal according to the fourth embodiment of the present disclosure. The horizontal axis shown in FIG. 4C represents time. As shown in FIG. 4C, the first signal SA may be similar to or the same as the first signal SA shown in FIG. 1C or FIG. 3B, so it will not be repeated herein. The operating method of the sensing device 4 of this embodiment is different from the operating method shown in FIG. 3B in that the second signal SB may have different voltages in the reset period T1 and in the sensing period T2 and readout time T3 respectively. For example, the second signal SB may have a voltage V21 in the reset period T1 and a voltage V22 in the sensing period T2 and readout time T3, and the voltage V21 is different from the voltage V22. In the embodiment of FIG. 4C, the voltage V21 may be greater than the voltage V22, but not limited thereto. The voltages shown in FIG. 4C is taken as an example, but the present disclosure is not limited thereto. In some embodiments, the voltage V21 may be less than the voltage V22.

As shown in FIG. 4A to FIG. 4C, in the readout period T3 before the reset period T1, the first signal SA may be at the voltage V5, such that the switching element 32 may be in the on state. Also, the second signal SB may have the voltage V22, so that the electrode 16 may have the voltage V22, and the voltage of the electrode 22 may be the same as the voltage of the readout line 36. When the thermal signal of the sensing device 4 is reset, that is, when the reset period T1 starts, the voltage of the second signal SB may be changed to the voltage V21, such that the electrode 16 may have the voltage V21, and the voltage of the electrode 22 may be different from the voltage V21 of the electrode 16. Accordingly, the direction of the electric field between the electrode 16 and the electrode 22 will change, such that the piezoelectric layer 38 is deformed to have the shape with the upward notch, such as the bowl shape or the cup shape. In the embodiment of FIG. 4A, in the reset period T1, the piezoelectric layer 38 may be in contact with the electrode 28, such that the thermistor 18, the piezoelectric layer 38 and the substrate 12 may form the thermal conduction path without being short-circuited to reset the thermal signal. It should be noted that since the electrode 22 is electrically connected to the electrode 16 through the thermistor 18, the voltage of the electrode 22 will be the same as the voltage V21 of the electrode 16 after a period of time, so that the electric field between the electrode 22 and the electrode 16 may change to zero. In the embodiment of FIG. 4C, the period of time may be the reset period T1, and a duration of the reset period T1 may be less than a duration of the reset period T1 shown in FIG. 1C or FIG. 3B. When the voltage of the electrode 22 is the same as the voltage V21 of the electrode 16 or a difference between them is less than a certain voltage, the piezoelectric layer 38 is separated from the electrode 28 and is deformed into the shape with the downward notch or the flat shape. At this time, the reset period T1 of the sensing device 4 ends, and the sensing device 4 proceeds the sensing period T2. In the sensing period T2, the heat on the thermistor 18 received from the light absorbing layer 26 is not easily dissipated, so that the heat received by the light absorbing layer 26 may be accurately retained.

In the readout period T3, the second signal SB may still at the voltage V22, so that there is no change in the direction of the electric field between the electrode 16 and the electrode 22. Accordingly, the piezoelectric layer 38 may maintain the shape with the downward notch or the flat shape, and the readout line 36 may read the thermal signal from the thermistor 18 through the electrode 22. After reading out the thermal signal, the sensing device 4 may return to the reset period T1 to reset the thermal signal on the thermistor 18, so as to facilitate improving the accuracy of the next detection.

In summary, in the sensing device of the present disclosure, through for example the electrostatic force between the electrode in the sensing pixel and the electrode in the substrate or the piezoelectric effect of the piezoelectric layer in the sensing pixel, the thermal signal detected by the sensing pixel may be reset, thereby improving the accuracy of the next detected thermal signal.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A sensing device, comprising:
    a substrate;
    a sensing pixel disposed on the substrate, and the sensing pixel comprising:
        a first electrode;
        a thermistor electrically connected to the first electrode and separated from the substrate by an air gap; and a third electrode electrically connected to the thermistor, wherein the third electrode is symmetrical to the first electrode with respect to the thermistor; and
a switching element, wherein a terminal of the switching element is electrically connected to the third electrode, and the third electrode is electrically connected to the first electrode through the thermistor,
wherein when the sensing pixel is operated in a period, the first electrode receives a first voltage, and a part of the thermistor moves toward the substrate, such that the thermistor is in thermal conduction with the substrate.

2. The sensing device according to claim 1, wherein the substrate comprises a second electrode, and the thermistor and the second electrode are separated from each other by the air gap.

3. The sensing device according to claim 2, wherein the sensing pixel comprises an insulating layer disposed between the thermistor and the air gap.

4. The sensing device according to claim 3, wherein in the period, the thermistor, the insulating layer and the second electrode form a thermal conduction path.

5. The sensing device according to claim 2, further comprising an insulating layer disposed between the second electrode and the air gap.

6. The sensing device according to claim 5, wherein in the period, the thermistor, the insulating layer and the second electrode form a thermal conduction path.

7. The sensing device according to claim 1, wherein a material of the thermistor comprises amorphous silicon.

8. The sensing device according to claim 1, wherein the sensing pixel further comprising a piezoelectric layer disposed between the thermistor and the air gap.

9. The sensing device according to claim 8, wherein in the period, the third electrode has a second voltage different from the first voltage, such that the piezoelectric layer is deformed.

10. The sensing device according to claim 8, wherein the sensing pixel further comprises a driving electrode disposed on a side of the piezoelectric layer facing the substrate.

11. The sensing device according to claim 10, wherein in the period, the driving electrode and the first electrode have different voltages respectively, such that the piezoelectric layer is deformed.

12. The sensing device according to claim 10, wherein in the period, the thermistor, the piezoelectric layer, the driving electrode and the substrate form a thermal conduction path.

13. The sensing device according to claim 8, wherein in the period, the thermistor, the piezoelectric layer and the substrate form a thermal conduction path.

14. The sensing device according to claim 1, wherein the sensing pixel further comprises:
an isolation layer disposed on the thermistor; and
a light absorbing layer disposed on the isolation layer.

15. The sensing device according to claim 14, wherein a material of the light absorbing layer comprises titanium, silicon nitride, titanium nitride or chromium nickel.

16. The sensing device according to claim 14, wherein the light absorbing layer is used to absorb infrared light.

17. The sensing device according to claim 16, wherein a wavelength of the infrared light ranges from 1 μm to 100 μm.

18. The sensing device according to claim 1, wherein the first electrode has a cantilever portion and a pillar portion, and the thermistor is disposed on a side of the cantilever portion.

* * * * *